US011618142B2

(12) United States Patent
Christian et al.

(10) Patent No.: US 11,618,142 B2
(45) Date of Patent: Apr. 4, 2023

(54) TOOL AND METHOD FOR INSTALLATION OF A DUST COVER ON A PULLEY

(71) Applicant: Caterpillar Inc., Peoria, IL (US)

(72) Inventors: Shawn M. Christian, New Braunfels, TX (US); Herchel R. Bryan, Jr., Seguin, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/403,599

(22) Filed: Aug. 16, 2021

(65) Prior Publication Data

US 2023/0049484 A1 Feb. 16, 2023

(51) Int. Cl.
*B25B 27/02* (2006.01)
*F16H 57/00* (2012.01)
*F16H 55/36* (2006.01)

(52) U.S. Cl.
CPC .......... *B25B 27/023* (2013.01); *F16H 57/00* (2013.01); *F16H 55/36* (2013.01); *F16H 2057/0062* (2013.01)

(58) Field of Classification Search
CPC .............................. B25B 27/023; F16H 57/00
See application file for complete search history.

(56) References Cited

U.S. PATENT DOCUMENTS

| 4,502,197 A * | 3/1985 | Harder .................. B25B 27/023 29/259 |
| 9,458,920 B2 | 10/2016 | Lannutti |
| 2015/0026941 A1 * | 1/2015 | Heimmer .............. B25B 27/023 29/235 |

FOREIGN PATENT DOCUMENTS

TW    I554357 B2    10/2016

OTHER PUBLICATIONS nomadic-one.com, "Ball joint separator tool for dust cover replacement,:" webpage downloaded from the Internet at www.nomadic-one.com/reflect/Ball-joint-separator-tool-dust-cover-replacement on May 20, 2021, 5 pp. (Sep. 2, 2012).

* cited by examiner

*Primary Examiner* — Jason L Vaughan
*Assistant Examiner* — Amanda Kreiling
(74) *Attorney, Agent, or Firm* — Leydig, Voit & Mayer, Ltd (57) ABSTRACT

Dust cover installation tool configured for placement of a dust cover in an annular opening of an idler pulley includes a frame and a cap press. The frame includes an actuator end core, an opposed placement plate, and at least first and second arms extending therebetween, and a third arm disposed between the first and second arms. The cap press includes a press plate and a rotatable threaded rod extending through a threaded bore in the actuator end core. Rotation of the threaded rod in a first direction within the threaded bore advances the press plate toward the placement plate.

20 Claims, 9 Drawing Sheets

TOOL AND METHOD FOR INSTALLATION OF A DUST COVER ON A PULLEY

TECHNICAL FIELD

This patent disclosure relates generally to pulleys, and, more particularly to the placement of a dust covers on a pulley.

BACKGROUND

Idler pulleys are utilized in many applications, including large engines. These pulleys generally include roller bearings or race bearings to facilitate smooth rotation of the pulley. In order to minimize degradation or failure of the bearings from dust or foreign objects, particularly in dusty environments, a dust cover may be placed on the pulley. The dust cover may pressed into the pulley using a driving tool and a mallet that sets the cover at a specific measurement for the particular pulley. While the initial placement of a dust cover may be performed in the assembly process, placement or replacement of a dust cover may be significantly complicated in the field due to a lack of accessibility or clearance. For example, in some installations, clearances may be as low as a few inches from the face of the pulley. Such a lack of clearance may make accessibility with conventional installation tools such as a driving tool and mallet essentially impossible.

SUMMARY

The disclosure describes, in one aspect, a dust cover installation tool configured for placement of a dust cover in an annular opening of an idler pulley including an outer annular surface having a distal end and a proximal end, the proximal end defining the annular opening disposed along an axis. The dust cover installation tool includes a frame and a cap press. The frame includes an actuator end core and a placement plate opposite the actuator end core. The actuator end core includes a threaded bore. The placement plate has an arcuate shape configured to be disposed against the distal end of the idler pulley. The frame further includes first and second arms extending between the actuator end core and the placement plate, the first arm and the second arm being disposed opposite one another. The frame also includes at least a third arm being disposed between the first arm and the second arm. The cap press includes a press plate disposed substantially parallel the actuator end core, and a rotatable threaded rod. The rotatable threaded rod extends through the threaded bore of the actuator end core, and is adapted to abut the press plate. Rotation of the rotatable threaded rod in a first direction within the threaded bore of the actuator end core advances the press plate toward the placement plate.

The disclosure described, in another aspect, a method of placing a dust cover in an annular opening of an idler pulley. The method includes providing a dust cover installation tool including a frame and a cap press. The frame includes an actuator end core having a threaded bore, a placement plate opposite the actuator end, first and second arms extending between the actuator end core and the placement plate and disposed at substantially opposite one another, and at least a third arm being disposed between the first arm and the second arm. The cap press includes a press plate and a rotatable threaded rod, the rotatable threaded rod extending through the threaded bore of the actuator end core. The method further includes transversely advancing the dust cover installation tool toward an outer annular surface of the idler pulley with the first and second arms disposed along either side of the idler pulley until the third arm is disposed adjacent the idler pulley to limit further movement. The method further includes rotating the rotatable threaded rod in a first direction within the threaded bore of the actuator end core to advance the press plate toward the annular opening in a proximal end of the idler pulley, and continuing to rotate the threaded rod in the first direction until the press plate confronts the proximal end of the idler pulley. The method further includes transversely moving the dust cover installation tool to disengage the dust cover installation tool from the idler pulley.

The disclosure describes, in yet another aspect, a dust cover installation tool configured for placement of a dust cover in an annular opening of an idler pulley when the idler pulley is installed in an application, the idler pulley including an outer annular surface having a distal end and a proximal end, the proximal end defining the annular opening disposed along an axis. The dust cover installation tool includes a frame and a cap press. The frame includes an actuator end core having a threaded bore, and a placement plate opposite the actuator end, the placement plate having an arcuate shape configured to be disposed against the distal end of the idler pulley. The frame further includes first and second arms extending between the actuator end core and the placement plate, the first arm and the second arm being disposed opposite one another. The frame further includes at least a third arm being disposed between the first arm and the second arm. The first, second, and third arms include positioning surfaces configured to rest against the outer annular surface of the idler pulley when the dust cover installation tool has been properly placed on the idler pulley. At least one of the actuator end core, the first arm, the second arm and the third arm includes at least one guidance bore. The cap press includes a press plate disposed along the axis substantially parallel the actuator end core. The press plate includes a magnet. At least one guidance pin extends through the guidance bore and engaging the press plate. At least one biasing element biases the press plate toward at least one of the actuator end core and the placement plate. The cap press further includes a rotatable threaded rod, the rotatable threaded rod extending through the threaded bore of the actuator end core, and being adapted to abut the press plate. Rotation of the rotatable threaded rod in a first direction within the threaded bore of the actuator end core advances the press plate toward the placement plate.

DETAILED DESCRIPTION

Figure 1:
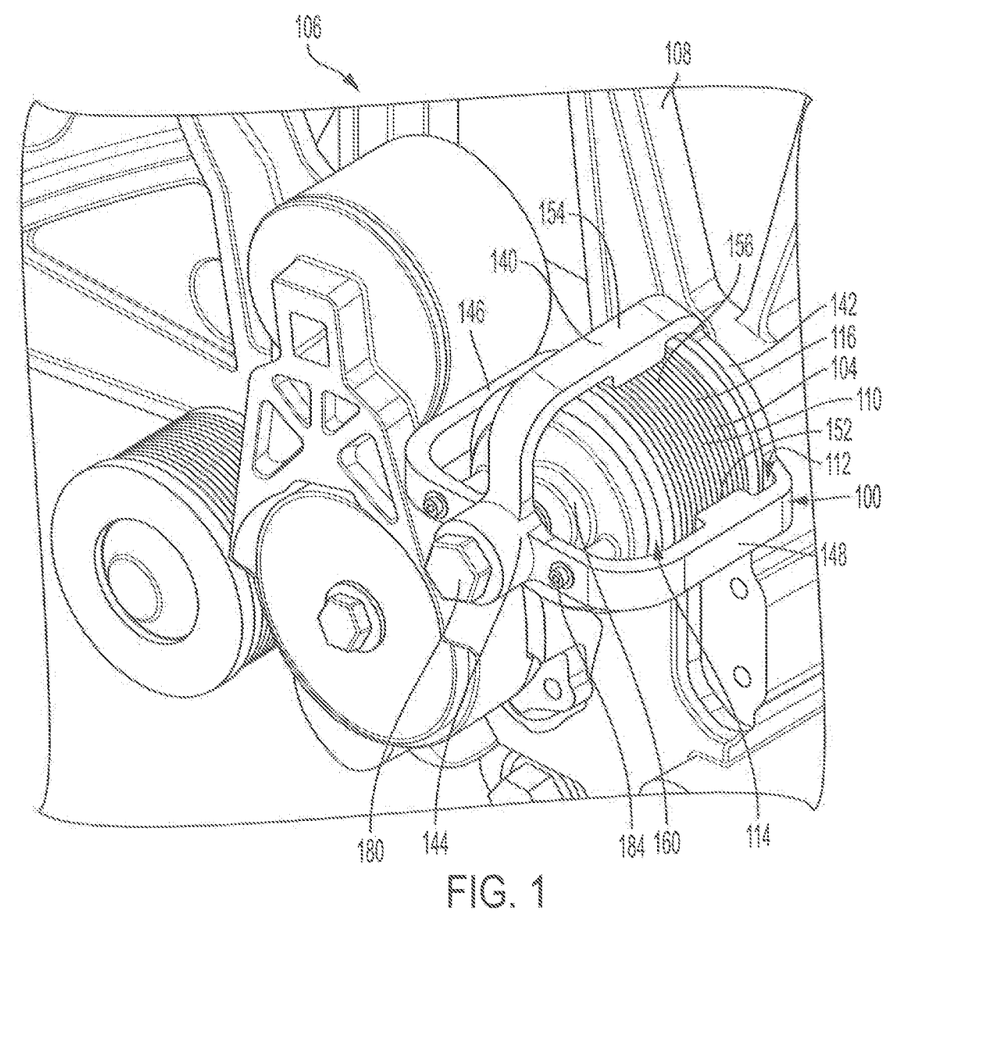
FIG. 1 is a fragmentary, isometric view of an installed idler pulley to which a tool for placing a dust cover on an idler pulley according to teachings of this disclosure is installed.
Figure 2:
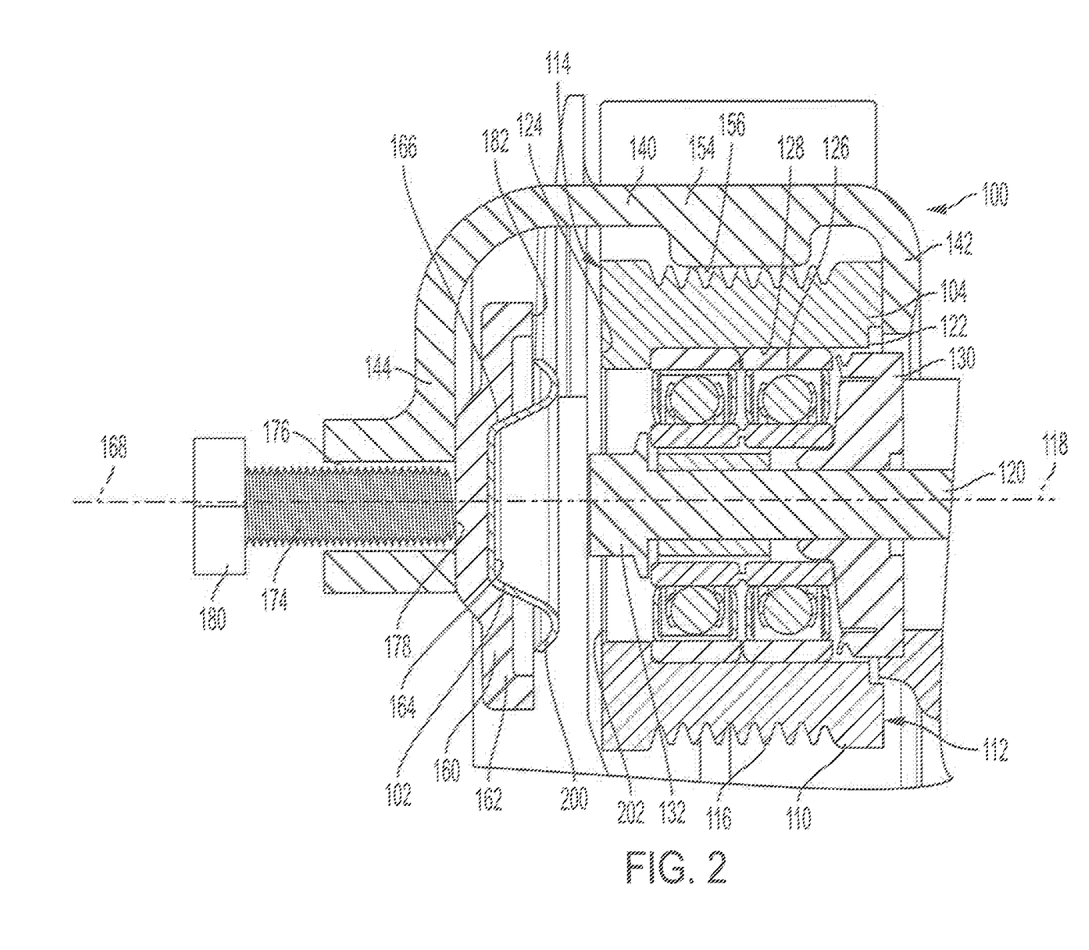
FIG. 2 is a cross-sectional view of the pulley and tool taken along line II-II in FIG. 1, the tool in position for placement of the dust cover.
Figure 3:
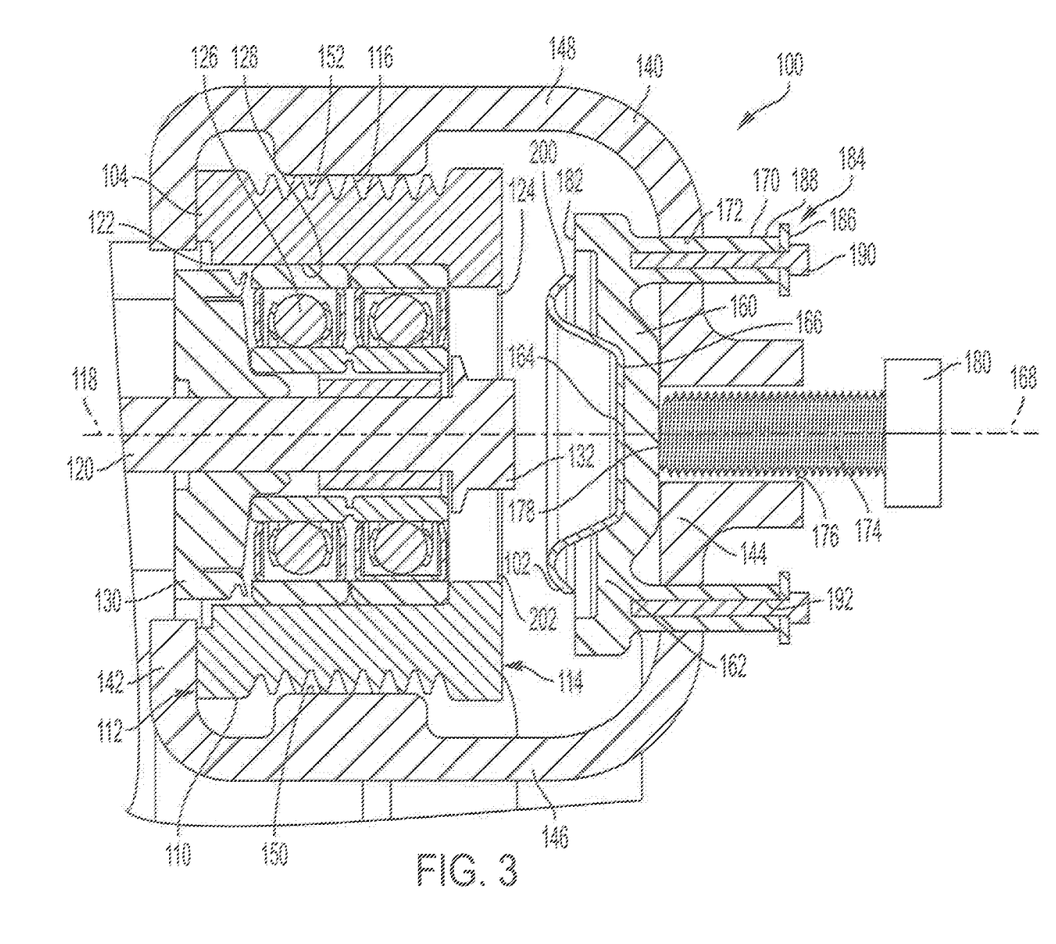
FIG. 3 is a cross-sectional view of the pulley and tool taken along line FIG. 1 with the tool in position for placement of the dust cover.
Figure 4:
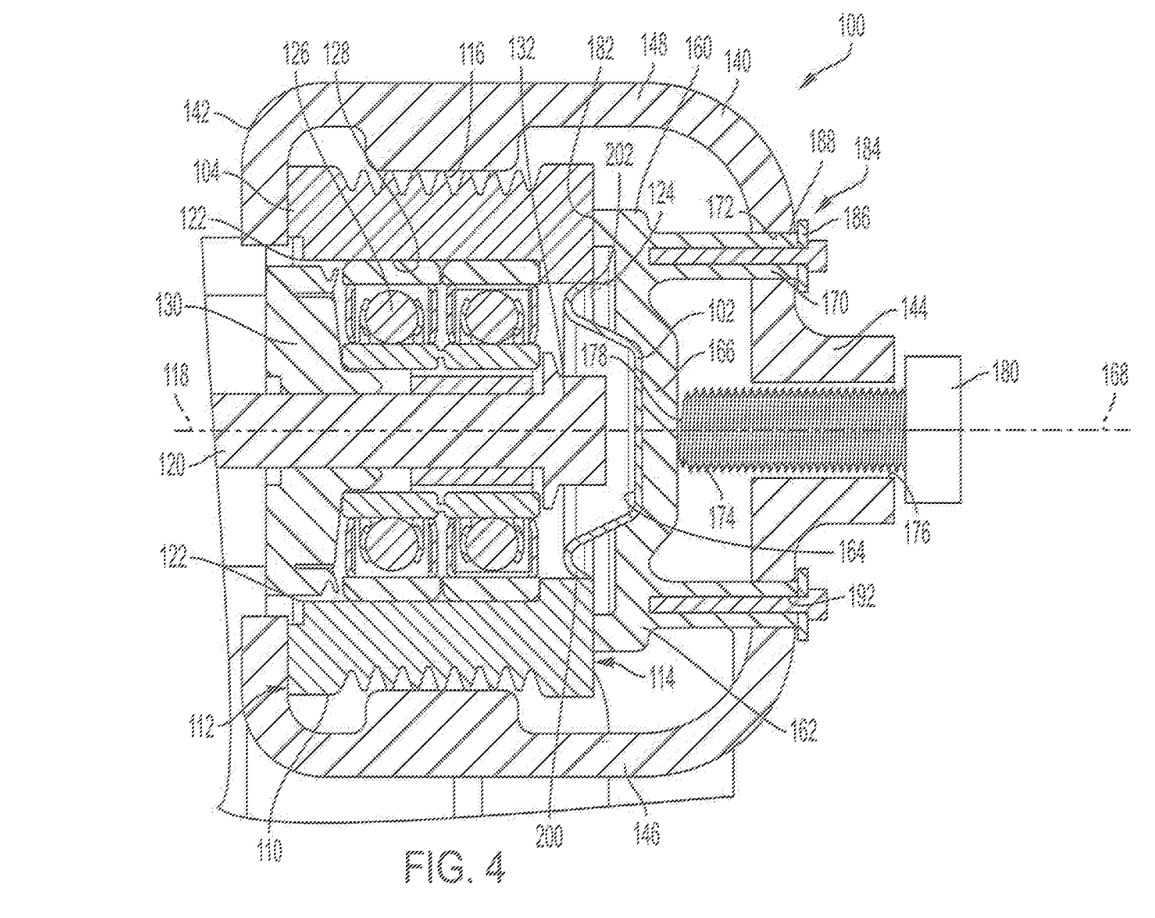
FIG. 4 is a cross-sectional view of the pulley and tool of FIG. 3 with the tool operated to place the dust cover in position on the idler pulley.
Figure 5:
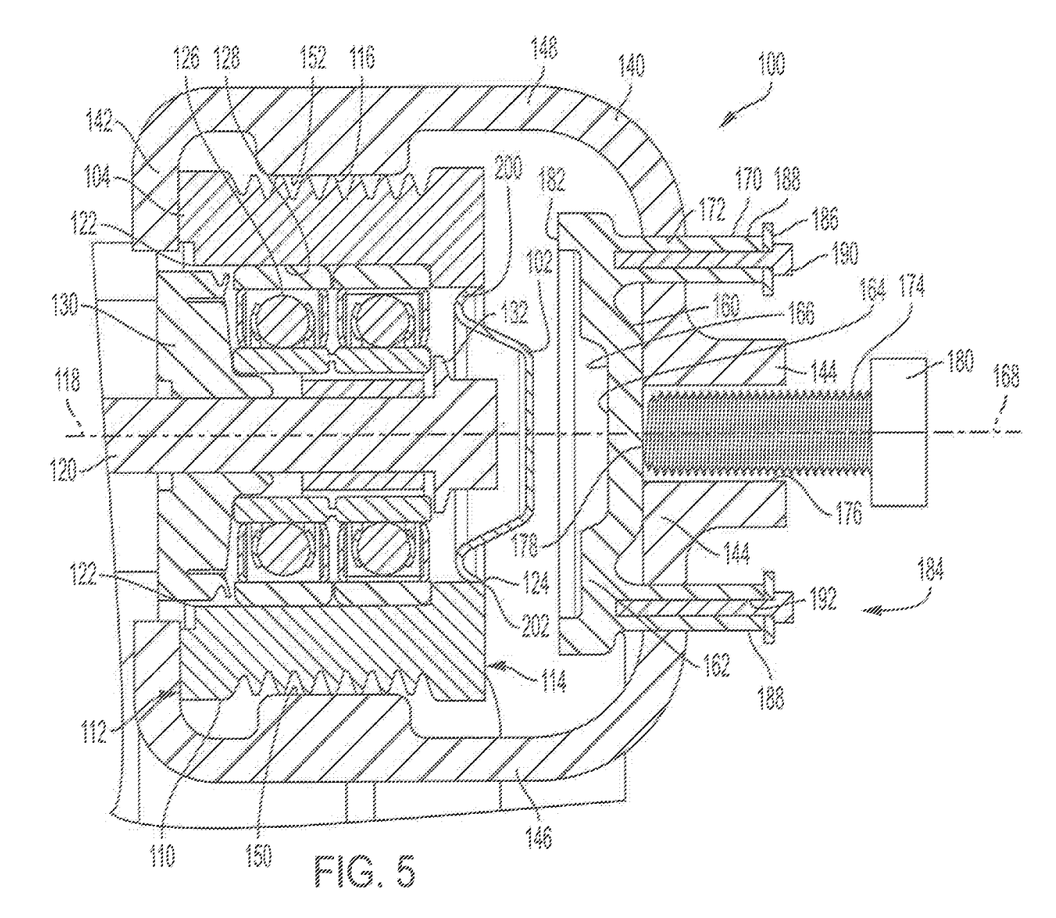
FIG. 5 is a cross-sectional view of the pulley and tool of FIGS. 3 and 4 with the tool partially retracted after placement the dust cover in position on the idler pulley.

This disclosure relates to a dust cover installation tool 100 for installing a dust cover 102 (see FIGS. 2-5) with an idler pulley 104 (see FIGS. 1-5). While the dust cover installation tool 100 may be utilized during an initial assembly process, the dust cover installation tool 100 may be particularly useful in installing the dust cover 102 when the idler pulley 104 is already installed in an application and limited access and clearances are available. While the idler pulley 104 may be associated with a plurality of applications, such as an internal combustion engines, for example, a fragmentary view of one such installation is illustrated in FIG. 1. Those of skill in the art will appreciate that the disposition of other components (generally designated as 106) of such applications, as well as the chassis 108 and outer housing panels (not illustrated) of the installation may interfere with open access to the idler pulley 104 that would allow the use of traditional tools for installation of the dust cover 102.

While the idler pulley 104 may be of any appropriate design, an exemplary idler pulley 104 and the dust cover installation tool 100 of this disclosure are illustrated in more detail in the cross-sectional views of FIGS. 2-5. The idler pulley 104 includes an outer annular surface 110 having a distal end 112 and a proximal end 114. The outer annular surface 110 may include a plurality of grooves 116. The idler pulley 104 is mounted for rotation about an axis 118, here defined by shaft 120, the distal end 112 defining an opening 122 through which the shaft 120 extends. The proximal end 114 likewise defining an annular opening 124 disposed along the axis 118. In order to facilitate rotation of the idler pulley 104 about the shaft 120, the illustrated embodiment of the idler pulley 104 includes a plurality of race bearings 126 are provided between the shaft 120 and an inner surface 128 of the idler pulley 104. The race bearings 126 are held in position by a retainer 130, and an enlarged head 132 of the shaft 120. While the dust cover installation tool 100 is illustrated in connection with a particular idler pulley 104 in a particular installation 106, 108, the arrangement disclosed herein has universal applicability in various other types of idler pulleys and machines as well.

Turning now to the structure of the dust cover installation tool 100, the dust cover installation tool 100 includes a frame 140, and a cap press 160. In operation, the frame 140 is disposed over and around the idler pulley 104, positioning the cap press 160 so that actuation of the cap press 160 presses the dust cover 102 into position within the annular opening 124 of the proximal end 114 of the idler pulley 104.

The frame 140 includes a placement plate 142 and an actuator end core 144, which are disposed opposite one another. The placement plate 142 is configured to be disposed adjacent the distal end 112 of the idler pulley 104. While alternative shapes may be provided, in the illustrated embodiment, the placement plate 142 has an arcuate shape, allowing the placement plate 142 to be disposed against the distal end 112 idler pulley 104, while not engaging the retainer 130 or the shaft 120.

In order to facilitate positioning of the dust cover installation tool 100 on the idler pulley 104, the frame 140 further including first and second arms 146, 148 extending between the actuator end core 144 and the placement plate 142. The first arm 146 and the second arm 148 are disposed opposite one another, thereby providing a structurally stable connection between the actuator end core 144 and the placement plate 142 for the application of a cap press force, which will be described further below. In order the facilitate proper lateral placement of the frame 140 on the idler pulley 104, the first and second arms 146, 148 include positioning surfaces 150, 152 configured to rest against the outer annular surface 110 of the idler pulley 104 when the dust cover installation tool 100 has been properly placed on the idler pulley 104. As may be seen in FIGS. 3-5, the positioning surfaces 150, 152 of the first and second arms 146, 148 may, for example, be in the form of protrusions that rest against the plurality of grooves 116 along the outer annular surface 110 of the idler pulley 104. Those of skill in the art will appreciate, however, that that the positioning surfaces 150, 152 of the first and second arms 146, 148 may be an interior contour of the first and second arms 146, 148 that rests against the entirety of or an alternative portion of the annular surface 110, such as portions of the annular surface 110 adjacent the distal and proximal ends 112, 114 of the idler pulley 104.

In order to facilitate centering of the idler pulley 104 within the dustcover installation tool 100, the frame 140 further includes at least a third arm 154 disposed between the first and second arms 146, 148. While a single third arm 154 is illustrated, those of skill in the art will appreciate that, for example, a third and a fourth arm may be provided. The third arm 154 likewise includes a positioning surface 156 configured to be disposed against the outer annular surface 110 of the idler pulley 104 between the first and second arms 146, 148. In this way, as the frame 140 is slid onto idler pulley 104, the positioning surface 156 of the third arm 154 inhibits movement of the dust cover installation tool 100 past the proper position on the idler pulley 104. In the illustrated embodiment, the third arm 154 likewise extends between the placement plate 142 and the actuator end core 144. Those of skill in the art will appreciate that in at least one alternative embodiment, the third arm 154 could be configured to extend laterally between the first and second arms 146, 148. Embodiments wherein the third arm 154 extends between the placement plate 142 and the actuator end core 144, however, may provide added structural stability to the dust cover installation tool 100.

The cap press 160 includes a press plate 162 that is configured to maintain the dust cover 102 in position for pressing into position for placement onto the idler pulley 104. In order to maintain the dust cover 102 in position on the press plate 162 prior to placement, the press plate 162 may include a magnet 164 configured to attract the dust cover 102. While the press plate 162 may include any appropriate structure, the press plate 162 may include a recessed portion 166 that receives a portion of the dust cover 102. The recessed portion 166 may be an opening, or may, for example, have a contour that compliments the contour of the dust cover 102 to be placed in order to facilitate proper positioning of the dust cover 102 relative to the annular opening 124 of the proximal end 114 of the idler pulley 104. The recessed portion 166 may include the magnet 164.

The cap press 160 is mounted to translate along a translation axis 168 that is substantially parallel to the axis 118 of the idler pulley 104. In the illustrated embodiment, the translation axis 168 is coincident with the axis 118 of the idler pulley 104. To this end, the cap press 160 includes at least two guidance pins 170 that are secured with the press plate 162. The guidance pins 170 are slidably received within cooperating guidance bores 172 extending through the first and second arms 146, 148. In the illustrated embodiment, the guidance pins 170 are unitarily formed with the press plate 162. In this way, the guidance pins 170 maintain the press plate 162 substantially parallel the actuator end core 144 during use.

In order to apply a translational force to the press plate 162, a threaded rod 174 is rotatably mounted through a threaded bore 176 extending through the actuator end core 144. A distal end 178 of the threaded rod 174 is disposed to bare against the press plate 162. In this way, rotation of the threaded rod 174 exerts a force on the press plate 162 to translate the press plate 162 and an associated dust cover 102 toward the idler pulley 014. To facilitate rotation of the thread rod 174, the proximal end of the threaded rod 174 may include an engagable head 180. In at least one embodiment, the threaded rod 174 is a bolt, allowing an operator to use a wrench (not shown) to engage the engagable head 180 of the bolt to rotate the threaded rod 174 in a first direction to apply a force to the press plate 162 to advance the press plate 162 toward the placement plate 142. Accordingly, when a dust cover 102 is carried by the press plate 162, the translational movement of the press plate 162 may be used to press the dust cover 102 into position in an idler pulley 104. Once placed, the threaded rod 174 may be rotated in a second, opposite direction to disengage the press plate 162 from the dust cover 102.

In order to limit movement of the press plate 162 in the first direction, that is, toward the idler pulley 104, one or more limiting structures may be provided. In at least one embodiment, the press plate 162 includes a limiting surface that is configured to confront the proximal end 114 of the idler pulley 104 when the dust cover 102 is properly installed with the idler pulley 104. In the illustrated embodiment, the press plate 162 is provided with a lip 182 that may act as a limiting surface. While the lip 182 of the illustrated embodiment extends continuously along the periphery of the press plate 162, those of skill in the art will appreciate the lip 182 may be discontinuous. In this way, the lip 182 of the press plate 162 acts as a limiting structure to limit movement of the press plate 162 in the first direction when in use. It will be appreciated, however, that an alternative surface of the press plate 162 may confront the proximal surface 114 of the idler pulley 104. By way of example only, absent the lip 182, an alternative distal surface of the press plate 162 may confront the proximal surface 114 of the idler pulley 104.

To further limit movement of the press plate 162 toward the idler pulley 104, and to further couple the cap press 160 to the frame 140, the guidance pins 170 may be provided with an enlarged head portion 184. While any appropriate structure may be provided, in the illustrated embodiment washers 186 are coupled to the proximal ends 188 of the guidance pins 170 by threaded pins or bolts 190 that engage axial bores 192 in the guidance pins 170.

Figure 6:
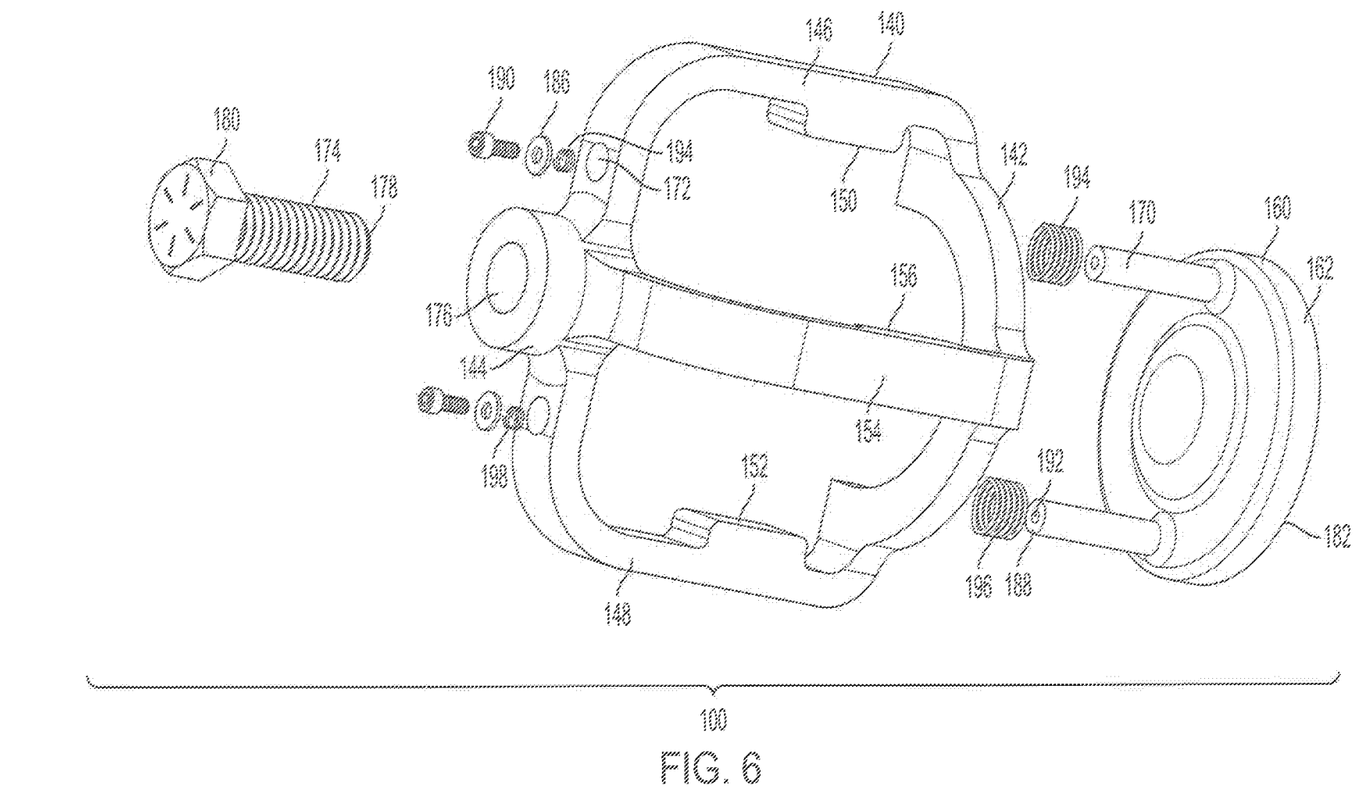
FIG. 6 is an exploded isometric view of the tool of FIGS. 1-5.
Figure 7:
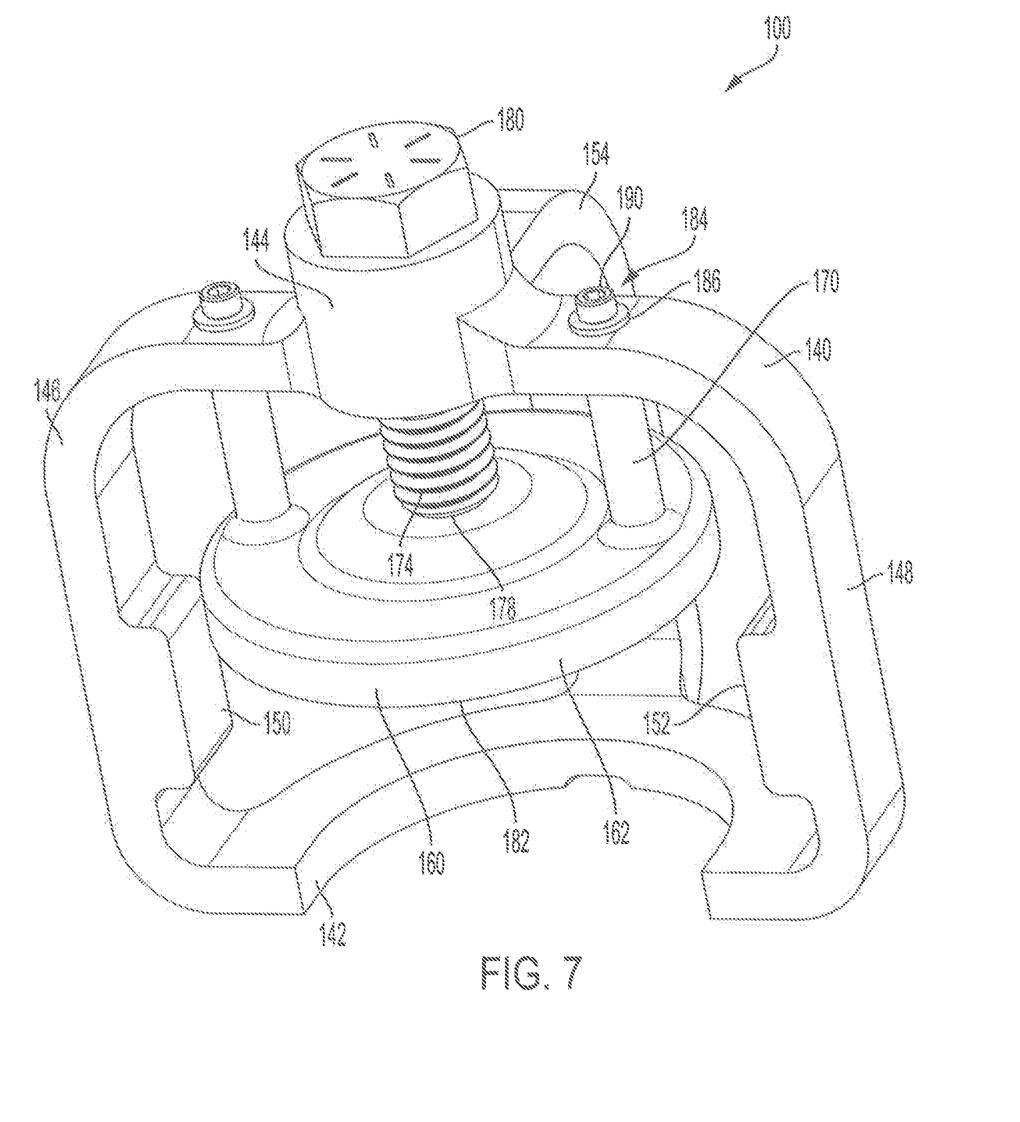
FIGS. 7-9 are isometric views of the tool of FIGS. 1-6.
Figure 8:
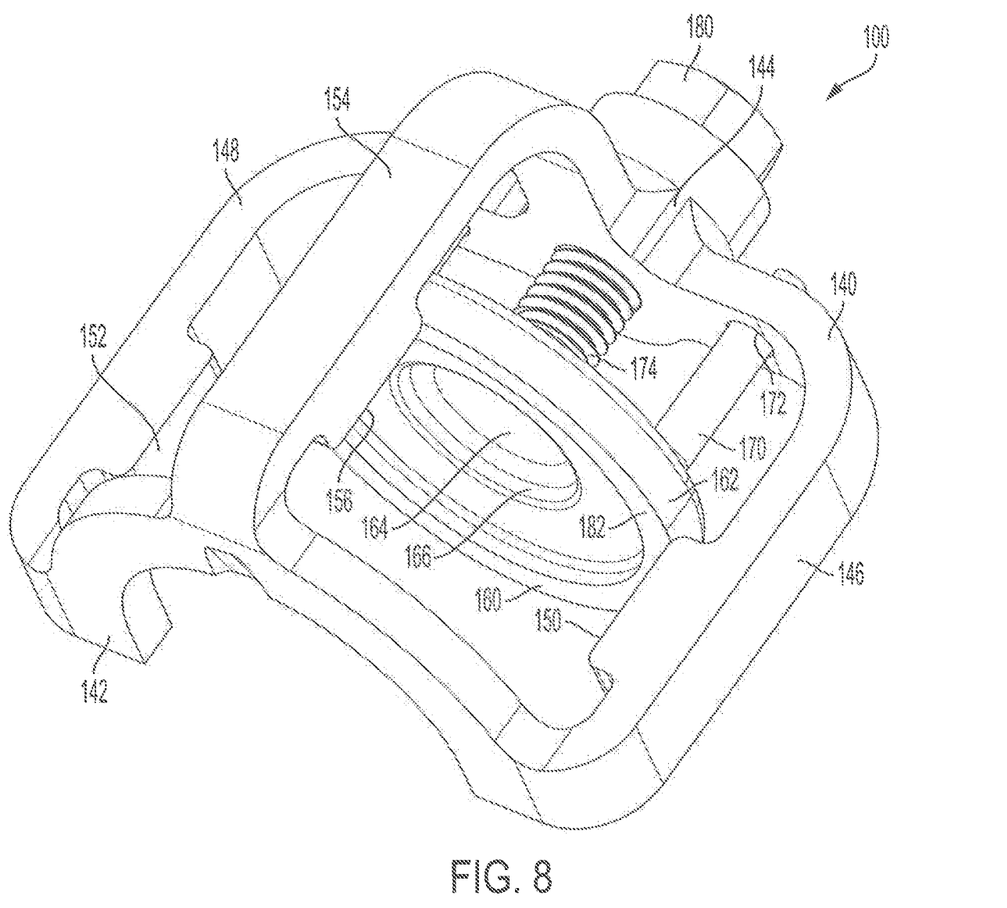
Figure 9:
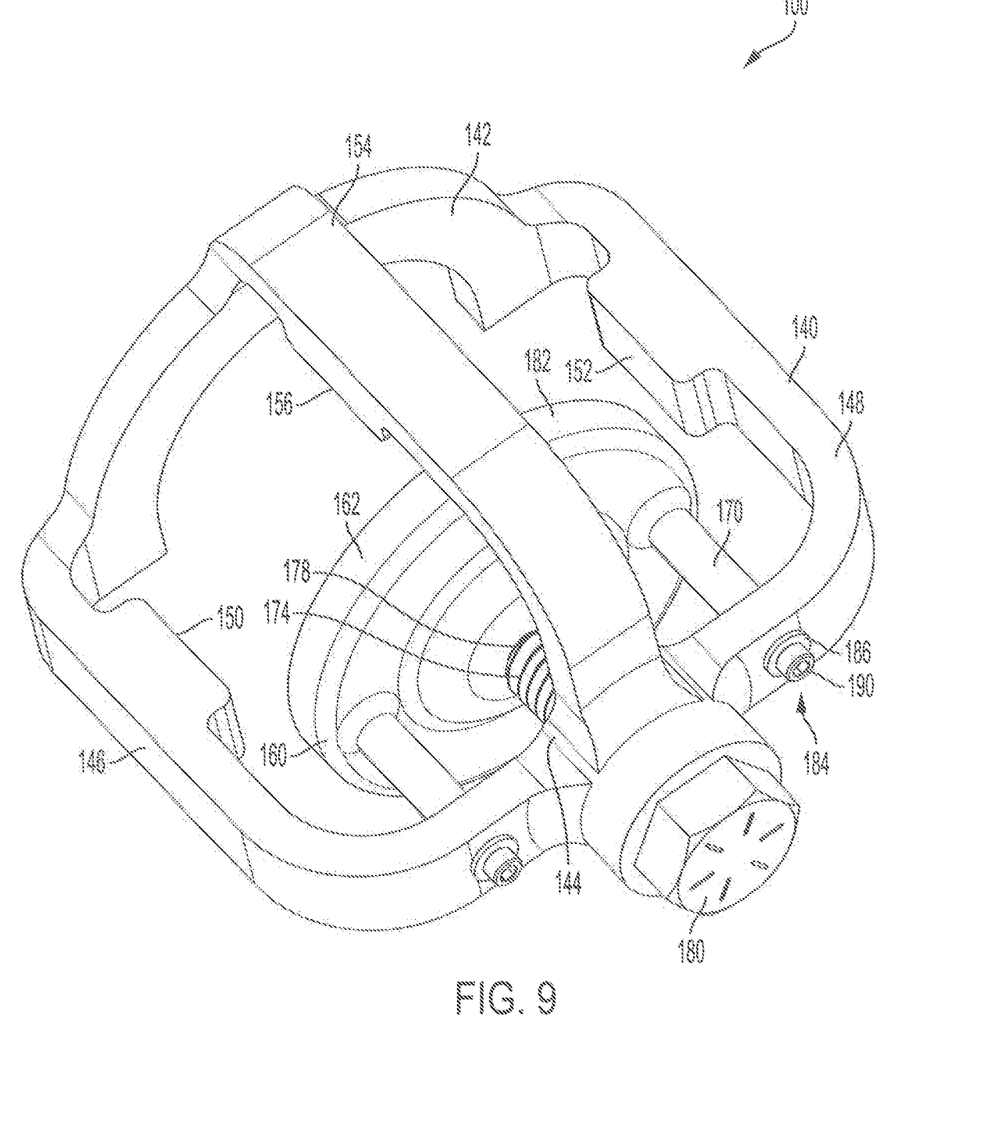

In at least some embodiments, in order to dispose the press plate 162 in a desired position relative to the frame 140, at least one biasing element 194 may be provided (see FIG. 6). The biasing element 194 may be of any appropriate type, such as, for example, a compression or tension spring. A biasing element 196 may be disposed, for example, about one or both of the guidance pins 170 between the press plate 162 and the frame 140. The biasing element 196 may be a spring element, such as a compression spring in order to bias the press plate 162 toward the placement plate 142, or a tension spring in order to bias the press plate 162 toward the opposite end of the frame 140, i.e., the end including the actuator end core 144. By way of further example, alternatively or additionally, a biasing element 198 in the form of a compression spring may be disposed about one or both of the guidance pins 170 between the enlarged head portion 184 (here, washer 186) and the frame 140 in order to bias the press plate 162 away from the placement plate 142.

Those of skill in the art will appreciate that the dust cover installation tool 100 may be configured to operate with various designs of dust covers 102 and idler pulleys 104. In the illustrated embodiment, for example, the dust cover 102 may be a resilient metallic structure having an outwardly extending lip 200. Accordingly, when the dust cover installation tool 100 is utilized to press the dust cover 102 into position within the annular opening 124 in the proximal end 114 of the idler pulley 104, the outwardly extending lip 200 may flex slightly inward. In order to facilitate sliding the dust cover 102 into position within the annular opening 124, the annular opening 124 may include a chamfer 202. Once in position, the dust cover 102 may be held in position by a combination of friction and the outward force of the outwardly extending lip 200. While the illustrated embodiment of the idler pulley 104 does not include an inwardly directed lip about the annular opening 124, some embodiments of idler pulleys may include such an inwardly directed lip, providing further interference between the dust cover 102 and the idler pulley 104.

In operation, the dust cover 102 is positioned with the press plate 162 and the dust cover installation tool 100 is transversely advanced toward an outer annular surface 110 of the idler pulley 104 with the first and second arms 146, 148 disposed along either side of the idler pulley 104 until the third arm 154 is disposed adjacent the idler pulley 104 to limit further movement. In the illustrated embodiment, the positioning surfaces 150, 162 of the first and second arms 146, 148 are disposed along either side of the outer annular surface, and the dust cover installation tool 100 is advanced until the positioning surface 156 of the third arm 154 is disposed adjacent the outer annular surface 110. The rotatable threaded rod 174 is then rotated in a first direction within the threaded bore 176 of the actuator end core 144 to advance the press plate 162 toward the annular opening 124 in the outer annular surface 110 of the idler pulley 104. As the press plate 162 continues to move toward the proximal end 114 of the idler pulley 104, the press plate 162 presses the dust cover 102 into the annular opening 124 in the proximal end 114 of the idler pulley 104. As the threaded rod 174 continues to be rotated in the first direction until the press plate 162 confronts the proximal end 114 of the idler pulley 104, this confrontation serving as a positive stop. Once the dust cover 102 is installed and the press plate 162 confronts the idler pulley 104, the threaded rod 174 may be rotated in a second direction, away from the idler pulley 104. In at least some embodiments, the press plate 162 may be moved in an axial direction away from the proximal end 114 of the idler pulley 104 either manually, or under the force of the at least one biasing element 196. The dust cover installation tool 100 may be moved transversely from around the idler pulley 104, disengaging the dust cover installation tool 100 from the idler pulley 104.

The dust cover installation tool 100 may be fabricated by any appropriate method and be made of any appropriate materials. For example, many components of the dust cover installation tool 100 may be cast, molded, or 3D printed.

INDUSTRIAL APPLICABILITY

The present disclosure is applicable to the replacement of a dust cover 102 on an idler pulley 104 without disassembling the idler pulley 104 from an installation 106, 108.

In at least some embodiments, the dust cover installation tool 100 may facilitate accurate placement of a dust cover 102 on an idler pulley 104, particularly in view of a hard stop provided by limiting structures, such as the lip 182 on the press plate 162. The hard stop may additionally inhibit the dust cover 102 from being pressed too far into the idler pulley 104, helping to prevent damage to the idler pulley 104 during installation.

At least some embodiments of the dust cover installation tool 100 facilitate placement of a dust cover 102 with the idler pulley 104 already installed in the field, allowing a field service technician to install a dust cover 102 in spaces as small as 3 inches from the pulley face.

Readily available tools, such as a wrench, may be utilized to rotate the threaded rod 174 of the dust cover installation tool 100.

At least some of the components of the dust cover installation tool 100 may be 3D printed. This may allow low volume production and on demand ordering. It additionally may allow the dust cover installation tool 100 to be tailored to a particular application.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of an and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A dust cover installation tool configured for placement of a dust cover in an annular opening of an idler pulley, the idler pulley including an outer annular surface having a distal end and a proximal end, the proximal end defining the annular opening disposed along a pulley axis, the dust cover installation tool comprising:

a frame, the frame including
an actuator end, the actuator end including a bore along a tool axis,
a placement surface spaced from the actuator end, the placement surface being configured to be disposed against the distal end of the idler pulley,
a first arm extending between the actuator end and the placement surface, and
a second arm extending between the actuator end and the placement surface, the first arm and the second arm being disposed opposite one another, and
first, second, and third spaced apart positioning surfaces defining an internal pulley receiving receptacle, the first, second, and third spaced apart positioning surfaces being disposed along an arc and configured to rest against the outer annular surface of the idler pulley when the dust cover installation tool has been properly placed on the idler pulley with the idler pulley in the internal pulley receiving receptacle and the pulley axis being co-linear with the tool axis;
a cap press, the cap press including
a press member disposed along the tool axis, the press member including a recessed receptacle portion configured to receive the dust cover therein, and
an actuation rod, the actuation rod extending along the tool axis and through the bore of the actuator end core, and being adapted to abut the press member,
whereby movement of the actuation rod in a first direction within the bore of the actuator end advances the press member toward the placement surface.

2. The dust cover installation tool of claim 1 wherein at least one of the actuator end core, the first arm and the second arm includes at least one guidance bore, and the cap press further includes at least one guidance pin extending through the guidance bore and engaging the press member.

3. The dust cover installation tool of claim 2 including at least two guidance pins, and the first arm and the second arm each include a guidance bore, the two guidance pins extending through respective ones of the guidance bores.

4. The dust cover installation tool of claim 2 further including at least one biasing element, said biasing element biasing the press member toward at least one of the actuator end core and the placement surface.

5. The dust cover installation tool of claim 4 wherein the biasing element is a spring element.

6. The dust cover installation tool of claim 1 wherein the press member further includes a magnet disposed to releasably retain the dust cover for placement of the dust cover in the annular opening of the idler pulley.

7. The dust cover installation tool of claim 1 wherein the press member includes at least one movement limiting structure, the at least one movement limiting structure extending toward the placement surface, the at least one movement limiting structure being configured to confront the proximal end of the idler pulley when the dust cover has been placed within the annular opening of the idler pulley.

8. The dust cover installation tool of claim 1 wherein the recessed receptacle portion being configured to accurately position the dust cover within the annular opening of the idler pulley along the tool axis.

9. The dust cover installation tool of claim 1 wherein the first positioning surface is disposed along the first arm and the second positioning surface is disposed along the second arm.

10. The dust cover installation tool of claim 9 further comprising a third arm and the third positioning surface is disposed along the third arm.

11. The dust cover installation tool of claim 10 wherein the third arm extends between the first and second arms.

12. A method of placing a dust cover in an annular opening of an idler pulley assembled in an application, the annular opening being disposed adjacent a proximal end of the idler pulley and along a pulley axis, the method comprising:
  providing a dust cover installation tool;
  disposing the dust cover on a press member of the dust cover installation tool along a tool axis of the dust cover installation tool;
  engaging first, second and third spaced apart positioning surfaces of an the internal pulley receiving receptacle of the dust cover installation tool with an outer annular surface of the idler pulley to align the tool axis of the dust cover installation tool with the pulley axis;
  advancing the press member with the dust cover disposed thereon in a first direction toward the annular opening adjacent the proximal end of the idler pulley,
  continuing to advance the press member and the dust cover in the first direction until the press member confronts the proximal end of the idler pulley and the dust cover is inserted into the annular opening of the idler pulley, and
  disengaging the dust cover installation tool from the idler pulley.

13. The method of claim 12 wherein engaging the first, second and third spaced apart positioning surfaces of the dust cover installation tool with the outer annular surface of the idler pulley includes transversely advancing the dust cover installation tool toward an outer annular surface of the idler pulley.

14. The method of claim 12 wherein advancing the press member includes rotating a threaded rod of the dust cover installation tool disposed along the tool axis and continuing to advance the press includes continuing to rotate the threaded rod.

15. The method of claim 12 further including releasably retaining the dust cover against the press member with a magnet until the dust cover is placed within the annular opening of the idler pulley.

16. The method of claim 12 further including advancing the press member to dispose a placement surface of the dust cover installation tool against a distal end of the idler pulley.

17. The method of claim 12 wherein advancing the press member includes rotating a threaded rod of the dust cover installation tool disposed along the tool axis in a first direction and continuing to advance the press includes continuing to rotate the threaded rod in the first direction.

18. The method of claim 17 further including, after rotating the threaded rod in the first direction until the press member confronts the distal end of the idler pulley, moving the press member out of engagement with the distal end of the idler pulley by rotating the threaded rod in a second direction, the second direction being opposite the first direction.

19. The method of claim 17 wherein rotating the threaded rod includes engaging a wrench with a bolt head of the threaded rod to rotate the threaded rod.

20. A dust cover installation tool configured for placement of a dust cover in an annular opening of an idler pulley assembled in an application, the idler pulley including an outer annular surface having a distal end and a proximal end, the proximal end defining the annular opening disposed along a pulley axis, the dust cover installation tool comprising:
  a frame, the frame including
    an actuator end, the actuator end including a threaded bore along a tool axis,
    a placement surface opposite the actuator end, the placement surface being configured to be disposed against the distal end of the idler pulley,
    a first arm extending between the actuator end core and the placement plate,
    a second arm extending between the actuator end core and the placement surface, the first arm and the second arm being disposed opposite one another,
    first, second, and third spaced apart positioning surfaces configured to rest against the outer annular surface of the idler pulley when the dust cover installation tool has been properly placed on the idler pulley, and
  a cap press, the cap press including
    a press member disposed along the tool axis substantially parallel the actuator end, the press member including a magnet, and
    a rotatable threaded rod, the rotatable threaded rod extending through the threaded bore of the actuator end, and being adapted to abut the press plate,
  whereby rotation of the rotatable threaded rod in a first direction within the threaded bore of the actuator end core advances the press member toward the placement surface.

* * * * *